United States Patent [19]

Finch

[11] 4,015,861
[45] Apr. 5, 1977

[54] STEERING WHEELS

[75] Inventor: Peter Molyneux Finch, Oxford, England

[73] Assignee: British Leyland UK Limited, London, England

[22] Filed: June 4, 1975

[21] Appl. No.: 583,832

[30] Foreign Application Priority Data

June 4, 1974 United Kingdom ............ 24606/74

[52] U.S. Cl. .................................. 280/750; 74/552
[51] Int. Cl.² ....................................... B60R 21/02
[58] Field of Search .............. 280/150 B, 748, 750, 280/751; 74/552; 188/1 C; 428/313, 315

[56] References Cited

UNITED STATES PATENTS

| | | | |
|---|---|---|---|
| 3,016,764 | 1/1962 | Fredericks, et al. | 74/552 |
| 3,675,505 | 7/1972 | Henning | 74/552 |

Primary Examiner—Robert R. Song
Assistant Examiner—Michael J. Forman
Attorney, Agent, or Firm—Brisebois & Kruger

[57] ABSTRACT

A vehicle steering wheel has the wheel rim connected to the hub by a dished metallic member that has a plurality of slots extending in spaced overlapping relationship around the dished member. The slotted dished member is relatively strong when steering effort is applied but in the event of driver impact is relatively easily tiltable to spread the impact load on the driver's chest and is then collapsible to absorb substantial impact energy.

1 Claim, 1 Drawing Figure

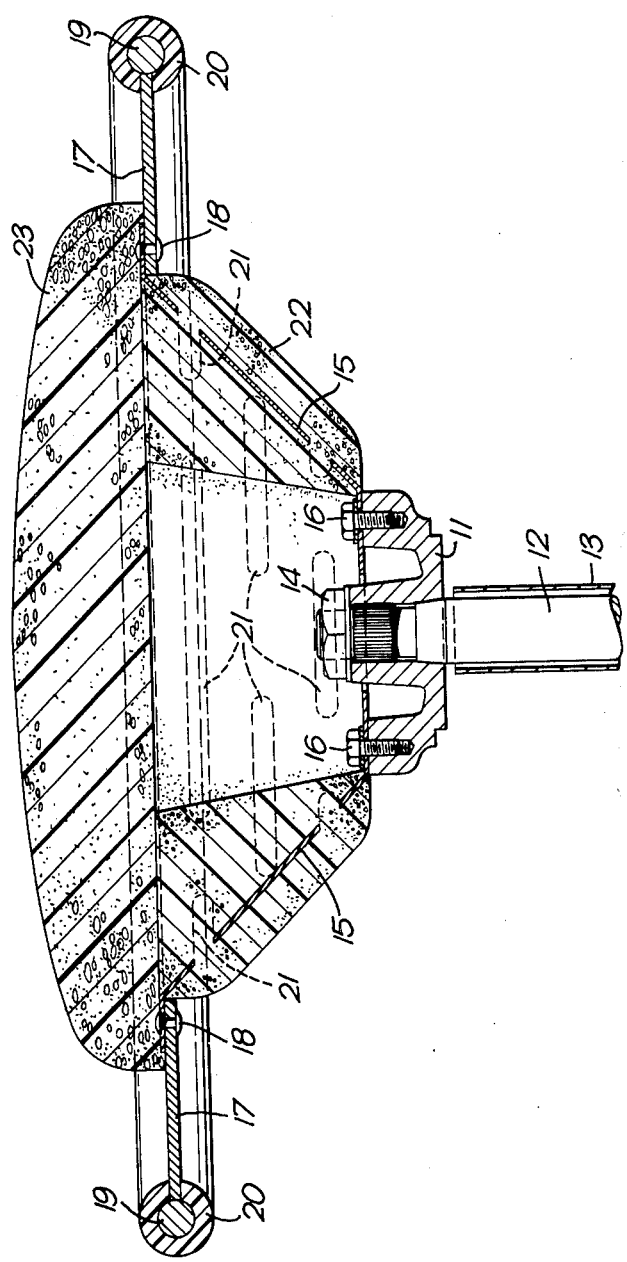

STEERING WHEELS

This invention relates to steering wheels and concerns particularly a steering wheel construction adapted to collapse if the driver is thrown against the wheel in an accident and to spread the impact load.

According to the invention a steering wheel includes a dished portion extending from a portion adapted to be connected to a steering column towards the rim of the steering wheel, and the walls of the dished portion are formed with a plurality of slots, each slot extending partially around the walls and the slots being in spaced overlapping relationship.

This it should be understood that the dished portion of such a wheel is relatively strong when steering effort is applied, but is relatively easily collapsible in the event of driver impact.

The rim of the steering wheel may be formed directly on the dished portion or may be connected thereto by spokes.

The dished portion may be fructro-conical in shape, and may be formed, for example, from a deep drawn pressing in which the slots are subsequently cut, or may be formed from a disc which is severed by a plurality of arcuate cuts and then expanded to a dished shape.

Preferably the walls of the dished portion are embedded in a rigid, or at least semi-rigid, plastics foam, and the steering wheel advantageously also includes a semi-rigid foam pad extending across at least the centre of its face.

A steering wheel according to the invention can be constructed such that, if the wheel should be struck by the driver, the wheel will not only be readily tilted to a position at which the impact force is spread over a large area but the wheel will then be able to collapse over a sufficient distance to absorb a substantially impact force before there is a danger of column penetration.

The invention is illustrated in the accompanying drawing in which the single FIG. is a cross section of a wheel having a slotted cone dished portion shown fitted to the upper end of a steering column.

The steering wheel illustrated in the drawing has a hub member 11 which may be attached to a steering column 12 enclosed within a column tube 13 by a nut 14 in conventional manner.

A dished member 15 is bolted to the hub member 11 by bolts such as 16, and is riveted to spoke members 17 by rivets such as 18. The spokes 17 are welded to a rim core member 19, and the core member 19 is encased in a plastics surround 20 in conventional manner.

The dished member 15 is formed from a deep drawn steel pressing with a plurality of spaced overlapping slots such as 21 extending around the member 15. And the dished member 15 is embedded in a rigid polyurethane foam material 22 and is covered by a pad of semi-rigid plastics foam 23.

Whilst the disposition of the slots 21 is such that they do not appreciably weaken the wheel assembly in respect of normal steering movements, in the event of a driver being thrown against the wheel in an accident the slots allow the dish to be readily distorted such that the rim 19 and pad 23 can tilt to spread the load on the driver's chest and the dished member 15 can then collapse to absorb impact energy.

In a modification of the above described steering wheel, the dished member is formed from a blank of sheet steel which is severed by a plurality of arcuate slits and then expanded to a dished shape.

I claim:

1. A steering wheel comprising a hub member for attachment to a steering column, a dished metallic member secured to said hub member and extending outwardly from said hub member, a wheel rim member secured to the periphery of said dished member; said dished member having a plurality of spaced overlapping slots formed therethrough and extending partially around said dished member; a body of rigid plastics foam material in which said dished member is embedded to improve impact energy absorbing properties, and a pad of semi-rigid plastics foam material which extends over at least said dished member on the face that in use is facing a driver.

* * * * *